United States Patent
Nilsson

(10) Patent No.: US 10,860,027 B2
(45) Date of Patent: Dec. 8, 2020

(54) METHOD OF ROAD VEHICLE TRAJECTORY PLANNING

(71) Applicant: VOLVO CAR CORPORATION, Gothenburg (SE)

(72) Inventor: Julia Nilsson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 318 days.

(21) Appl. No.: 15/672,654

(22) Filed: Aug. 9, 2017

(65) Prior Publication Data
US 2018/0059670 A1   Mar. 1, 2018

(30) Foreign Application Priority Data

Aug. 29, 2016   (EP) .................................... 16186135

(51) Int. Cl.
*B60W 30/09*   (2012.01)
*B60W 30/18*   (2012.01)
(Continued)

(52) U.S. Cl.
CPC ........... *G05D 1/0214* (2013.01); *B60W 30/09* (2013.01); *B60W 30/095* (2013.01);
(Continued)

(58) Field of Classification Search
CPC ............... B60W 30/09; B60W 30/095; B60W 30/0956; B60W 30/18163; B60W 40/04;
(Continued)

(56) References Cited

U.S. PATENT DOCUMENTS

| 7,418,372 B2 * | 8/2008 | Nishira ................ B60K 31/047 |
| | | 700/44 |
| 9,229,453 B1 | 1/2016 | Lee |
| (Continued) | | |

FOREIGN PATENT DOCUMENTS

| CN | 102358287 A | 2/2012 |
| CN | 105539586 A | 5/2016 |
| CN | 105857294 A | 8/2016 |

OTHER PUBLICATIONS

Julia Nilsson et al., "Lane Change Maneuvers for Automated Vehicles", IEEE Transactions on Intelligent Transportation Systems, vol. PP, No. 99, Aug. 26, 2016, XP055349895, pp. 1-10.
(Continued)

*Primary Examiner* — Anshul Sood
(74) *Attorney, Agent, or Firm* — Brooks Kushman P.C.

(57) ABSTRACT

The present disclosure relates to a method of trajectory planning for maneuvers for an ego vehicle (E) equipped with a sensor systems, a prediction systems, a control system, and a decision-making system. The method includes determining possible lateral motion trajectories of a requested maneuver, longitudinal safety critical zones which correspond to each of the determined possible lateral motion trajectories, a longitudinal motion trajectory of the requested maneuver, lateral safety critical zones which correspond to the determined longitudinal motion trajectory of the requested maneuver, and a lateral motion trajectory of the requested maneuver. The present disclosure also relates to a driver assistance system arranged to perform the method and a vehicle including such a system.

20 Claims, 8 Drawing Sheets

(51) Int. Cl.
| | |
|---|---|
| *B60W 40/04* | (2006.01) |
| *G05D 1/00* | (2006.01) |
| *G05D 1/02* | (2020.01) |
| *B60W 30/095* | (2012.01) |
| *G08G 1/16* | (2006.01) |

(52) U.S. Cl.
CPC .. *B60W 30/0956* (2013.01); *B60W 30/18163* (2013.01); *B60W 40/04* (2013.01); *G05D 1/0088* (2013.01); *G08G 1/166* (2013.01); *G08G 1/167* (2013.01); *B60W 2554/80* (2020.02); *B60W 2720/12* (2013.01); *G05D 2201/0213* (2013.01)

(58) Field of Classification Search
CPC .......... B60W 2550/30; B60W 2720/12; G05D 1/0088; G05D 1/0214; G05D 2201/0213; G08G 1/166; G08G 1/167
See application file for complete search history.

(56) References Cited

U.S. PATENT DOCUMENTS

| | | | |
|---|---|---|---|
| 2005/0267608 | A1 | 12/2005 | Nishira et al. |
| 2012/0109610 | A1* | 5/2012 | Anderson ............. B60W 30/09 703/8 |
| 2012/0330541 | A1* | 12/2012 | Sakugawa ............. G08G 1/166 701/301 |
| 2013/0325306 | A1* | 12/2013 | Caveney ........... B60W 30/0953 701/117 |
| 2015/0073663 | A1* | 3/2015 | Nilsson ................. B60W 30/08 701/41 |
| 2015/0120138 | A1* | 4/2015 | Zeng .................. B62D 15/0265 701/41 |

OTHER PUBLICATIONS

Julia Nilsson et al., "Predictive Manoeuvre Generation for Automated Driving", 16th International IEEE Annual Conference on Intelligent Transportation Systems (ITSC 2013), Oct. 6-9, 2013, MoC6.1, XP055348746, pp. 418-423.
Julia Nilsson et al., "Receding Horizon Maneuver Generation for Automated Highway Driving", Control Engineering Practice, vol. 41, May 2015, XP055348739, pp. 124-133.
Julia Nilsson et al., "Longitudinal and Lateral Control for Automated Lane Change Maneuvers", 2015 American Control Conference, Jul. 1-3, 2015, XP055348606, pp. 1399-1404.
Extended European Search Report for European Application No. EP 16186135.6, dated Aug. 3, 2017, 9 Pages.
T. Vaa, M. Penttinen, et al . . . , "Intelligent Transport Systems and Effects on Road Traffic Accidents: State of the Art," IET Intelligent Transport Systems, vol. 1, No. 2, pp. 81-88, Jun. 2007.
Volvo Car Group Global Media Newsroom, "Volvo Car Corporation Part of Major European Study that Reveals: New Safety Technology Reduces the Risk of Motorway Rear-end Impacts by up to 42 Percent," Jun. 2012, <<https://www.media.volvocars.com/global/en-gb/media/pressreleases/44204 >>.
Anderson et al., Optimal Control: Linear Quadratic Methods, Englewood Cliffs, New Jersey, 1990 edition.
Mattingley et al., "CVXGEN: A Code Generator for Embedded Convex Optimization," Optimization and Engineering, vol. 13, No. 1, pp. 1-27, 2012.
Peden et al., "World Report on Road Traffic Injury Prevention," World Health Organization, The World Bank, Geneva, 2004.
Van Schijndel-De Nooij et al., "Definition of Necessary Vehicle and Infrastructure Systems for Automated Driving," European Commission, Study Report, Smart 2010/0064, Jun. 2011.
Gonzalez et al., "A Review of Motion Planning Techniques for Automated Vehicles," IEEE Transactions on Intelligent Transportation Systems, vol. 17, No. 4, pp. 1135-1145, Nov. 2015.
Ferguson et al., "A Guide to Heuristic-based Path Planning," Proceedings of the Workshop on Planning under Uncertainty for Autonomous Systems at the International Conference on Automated Planning and Scheduling, Jun. 2005.
Dolgov et al., "Path Planning for Autonomous Vehicles in Unknown Semi-structured Environments," The International Journal of Robotics Research, vol. 29, No. 5, pp. 485-501, Apr. 2010.
Sivaraman et al., "Dynamic Probabilistic Drivability Maps for Lane Change and Merge Driver Assistance," IEEE Transactions on Intelligent Transportation Systems, vol. 15, No. 5, pp. 2063-2073, Oct. 2014.
Elbanhawi et al., "Sampling-Based Robot Motion Planning: A Review," IEEE Access, vol. 2, pp. 56-77, Jan. 2014.
Lan et al., "Continuous Curvature Path Planning for Semi-Autonomous Vehicle Maneuvers Using RRT", European Control Conference, pp. 2360-2365, Jul. 2015.
Ma et al., "Efficient Sampling-Based Motion Planning for On-Road Autonomous Driving," IEEE Transactions on Intelligent Transportation Systems, vol. 16, No. 4, pp. 1961-1976, Aug. 2015.
Han et al., "Bezier Curve Based Path Planning for Autonomous Vehicle in Urban Environment," IEEE Intelligent Vehicles Symposium, pp. 1036-1042, Jun. 2010.
Funke et al., "Up to the Limits: Autonomous Audi TTS," IEEE Intelligent Vehicles Symposium, pp. 541-547, Jun. 2012.
Petrov et al., "Modeling and Nonlinear Adaptive Control for Autonomous Vehicle Overtaking," IEEE Transactions on Intelligent Transportation Systems, vol. 15, No. 4, pp. 1643-1656, Aug. 2014.
Anderson et al., "Constraint-Based Planning and Control for Safe, Semi-Autonomous Operation of Vehicles," IEEE Intelligent Vehicles Symposium, pp. 383-388, Jun. 2012.
Bahram et al., "A Prediction-Based Reactive Driving Strategy for Highly Automated Driving Function on Freeways," IEEE Intelligent Vehicles Symposium, pp. 400-406, Jun. 2014.
Schildbach et al., "Scenario Model Predictive Control for Lane Change Assistance on Highways," IEEE Intelligent Vehicles Symposium, pp. 611-616, Jun. 2015.
Rawlings et al., "Model Predictive Control: Theory and Design," 2nd Ed. Madison (WI): Nob Hill Publishing, 2012 (First Published 2009).
Nilsson et al., "Longitudinal and Lateral Control for Automated Yielding Maneuvers," IEEE Transactions on Intelligent Transportation Systems, pp. 1404-1414, vol. 17, No. 5, May 2016.
Nilsson et al., "If, When, and How to Perform Lane Change Maneuvers on Highways," IEEE Intelligent Transportation Systems Magazine, 2016.
Nilsson et al., "Maneuver Generation and Control for Automated Highway Driving," The 19th World Congress of the International Federation of Automatic Control, pp. 6301-6306, Aug. 2014.
Lefevre et al., "A Survey on Motion Prediction and Risk Assessment for Intelligent Vehicles," Robomech Journal, vol. 1. No. 1, pp. 1-14, Jul. 2014.
Jansson, "Collision Avoidance Theory with Application to Automotive Collision Mitigation," Ph.D. Thesis, Linkoping University, 2005.
Chinese Office Action for Chinese Application No. 201710723378.8 dated Aug. 5, 2020.

* cited by examiner

| Vehicle | $\Delta x_0$ [m] | $v_{x_0}$ [m/s] | $a_{x_0}$ [m/s$^2$] |
|---|---|---|---|
| $E$ | $\{0, 0\}$ | $\{15, 15\}$ | $\{0, 0\}$ |
| $S_1$ | $\{20, 25\}$ | $\{15, 15\}$ | $\{0, 0\}$ |
| $S_2$ | $\{-5, -20\}$ | $\{15, 25\}$ | $\{0, 0\}$ |
| $S_3$ | $\{-30, -55\}$ | $\{15, 25\}$ | $\{0, 0\}$ |

Fig. 9

| | | |
|---|---|---|
| $v_x \in \{0, 30\}$ [m/s] | $t_s = 1$ [s] | $\Gamma = 0.5$ [s] |
| $a_x \in \{-4, 2\}$ [m/s$^2$] | $\epsilon = 0.5$ [m] | $\alpha = 1$ |
| $\Delta a_x \in \{-3t_s, 1.5t_s\}$ [m/s$^2$] | $\tau = 0.5$ [s] | $\beta = 1$ |
| $N = 10$ | $\Xi = 0.5$ [m] | $\gamma = 1$ |

Fig. 10

| | | |
|---|---|---|
| $v_y \in \{-2, 2\}$ [m/s] | $N = 10$ | $\phi = 1$ |
| $a_y \in \{-2, 2\}$ [m/s$^2$] | $t_s = 1$ [s] | $\varphi = 1$ |
| $\Delta a_y \in \{-0.5t_s, 0.5t_s\}$ [m/s$^2$] | | $\psi = 1$ |

Fig. 11

# METHOD OF ROAD VEHICLE TRAJECTORY PLANNING

CROSS-REFERENCE TO RELATED APPLICATIONS

This application claims foreign priority benefits under 35 U.S.C. § 119(a)-(d) to European patent application number EP 16186135.6, filed Aug. 29, 2016, which is incorporated by reference in its entirety.

TECHNICAL FIELD

The present application relates to a method of trajectory planning for maneuvers for an ego vehicle and also an Advanced Driver Assistance System arranged to perform the method as well as a vehicle comprising such an Advanced Driver Assistance System.

BACKGROUND

Over the last decades there has been significant progress within the field of autonomous vehicles. From first presented as a futuristic idea in the Futurama exhibit at the 1939 New York World's Fair, ventures such as The DARPA Grand and Urban challenge, Safe Road Trains for the Environment (SARTRE), and the Google autonomous car have demonstrated the possibility and feasibility of the technology. Nonetheless, there is still a large gap between the demonstrated technology and commercially available vehicle systems.

Current Advanced Driver Assistance Systems (ADAS), such as Adaptive Cruise Control (ACC), Lane Keeping Aid (LKA), Traffic Jam Assist (TJA), and collision warning with auto brake, have been shown to improve the driver's comfort and safety. It is therefore expected that further developed automated functionality will continue to enhance driver comfort and overall traffic safety by offering people the freedom to choose how to spend their time in their vehicle, e.g., work, relax or even have a snooze, without jeopardizing the safety of themselves or other traffic participants.

Several approaches to trajectory planning have previously been proposed. The most common techniques include but are not limited to methods that can be divided into four groups namely graph search, randomized sampling, curve interpolation, and numerical optimization. While all of the proposed methods have their respective benefits and drawbacks, the main compromise usually entails the trade-off between required computational resources and ability to generate smooth collision-free trajectories which are applicable to general traffic situations. Furthermore, many of the commonly used trajectory planning methods lack formal stability analysis and verification methods and thereby rely heavily on extensive simulation and experimental testing for validation.

SUMMARY

Embodiments herein aim to provide an improved, safe and robust, low-complexity, trajectory planning method which is applicable to both highway and urban traffic situation maneuvers such as lane changes, intersection crossing, and roundabout entry.

This is provided through a method of trajectory planning for maneuvers for an ego vehicle equipped with: sensor systems to measure its position on the road as well as the relative positions and velocities of surrounding traffic participants and objects; prediction systems to estimate the motion trajectories of surrounding traffic participants and objects over a defined time horizon; low-level control systems capable of following a planned trajectory; and a decision-making system to provide a desired maneuver request, the method comprising the steps of, using receding horizon control applying a finite prediction horizon, for determining: possible lateral motion trajectories of a requested maneuver; longitudinal safety critical zones which correspond to each of the determined possible lateral motion trajectories; a longitudinal motion trajectory of the requested maneuver; lateral safety critical zones which correspond to the determined longitudinal motion trajectory of the requested maneuver; a lateral motion trajectory of the requested maneuver.

The provision of longitudinal and lateral trajectories determined as above provides for planning smooth and dynamically feasible trajectories, applicable to general traffic situations, both highway and urban traffic situation maneuvers such as lane changes, intersection crossing, and roundabout entry, which allow the ego vehicle to safely interact with other traffic participants, e.g., vehicles, cyclists, and pedestrians, in real-time with the restricted computational resources of a standard passenger vehicle platform.

According to a second embodiment is provided that the method further comprises generating a set of possible lateral motion trajectories for the requested maneuver by initiating the lateral motion of the maneuver over a discrete time interval.

The provision of generating a set of possible lateral motion trajectories for the requested maneuver by initiating the lateral motion of the maneuver over a discrete time interval provides an efficient way of generating the set of possible lateral motion trajectories for the requested maneuver.

According to a third embodiment is provided that the discrete time interval is defined as $i \in [1, \ldots, \min(N, N_g) - (n_o + n_{min})]$ where N denotes the prediction horizon, $N_g$ denotes the time instance for which the targeted inter-vehicle traffic gap is no longer appropriate, $n_o$ denotes the predicted time it takes for any surrounding vehicles constituting a tight inter-vehicle traffic gap to smoothly adjust their velocities in order to allow ego vehicle (E) to enter the gap, and $n_{min}$ denotes the minimum time it takes for ego vehicle (E) to laterally move into the targeted inter-vehicle traffic gap.

The provision of defining the discrete time interval as above provides an intuitive way of setting an appropriate discrete time interval.

According to a fourth embodiment is provided that the method further comprises defining, when the set of possible lateral motion trajectories of the maneuver has been generated, a corresponding longitudinal safety critical zone for each relevant surrounding traffic participant and object as an appropriate miscellaneous shape, such as rectangular, triangular, or ellipsoid.

The provision of defining a corresponding longitudinal safety critical zone for each relevant surrounding traffic participant and object as an appropriate miscellaneous shape provides for vehicle maneuvers that would have been unfeasible with respect to rectangular safety critical zones defined by, e.g., a time gap which ego vehicle should maintain to the surrounding vehicles.

According to a fifth embodiment is provided that the method further comprises defining, for each possible lateral motion trajectory of the requested maneuver and corresponding safety critical zones, the maximum and minimum bounds on the longitudinal position of ego vehicle at each time instance as a longitudinal safety corridor, such that the longitudinal distance which ego vehicle should maintain to each relevant surrounding traffic participant and object is defined with respect to each possible lateral motion trajectory of the requested maneuver and corresponding safety critical zones.

The provision of defining a longitudinal safety corridor, as above, provides accounting for each possible lateral motion trajectory of the requested maneuver and corresponding safety critical zones.

According to a sixth embodiment is provided that the method further comprises determining, for each longitudinal safety corridor, if there exists a longitudinal trajectory which allow ego vehicle to be positioned within the corridor over the prediction horizon and selecting, from the determined existing longitudinal trajectories for all longitudinal safety corridors, the most appropriate longitudinal trajectory.

The provision of determining if there exists a longitudinal trajectory, as above, provides an efficient way of evaluating each longitudinal safety corridor.

According to a seventh embodiment is provided that the method further comprises updating the safety critical zones of each relevant surrounding traffic participant and object according to the longitudinal motion of the requested maneuver utilizing the determined longitudinal motion trajectory of the requested maneuver.

The provision of updating the safety critical zones of each relevant surrounding traffic participant and object, as above, provides for further improving the trajectory planning.

According to an eight embodiment is provided that the step of determining a lateral motion trajectory of the requested maneuver further comprises formulating the lateral motion trajectory planning problem as a standard Quadratic Program optimization problem and solving this problem.

The provision of formulating the lateral motion trajectory planning problem as a standard Quadratic Program optimization problem and solving this problem provides an efficient use of the restricted computational resources of a standard passenger vehicle platform.

According to a ninth embodiment is provided that the method further comprises utilizing at least part of one of the determined longitudinal and lateral motion trajectories of the requested maneuver to determine longitudinal and/or lateral control signals for control of the ego vehicle.

The provision of utilizing at least part of one of the determined longitudinal and lateral motion trajectories of the requested maneuver to determine longitudinal and/or lateral control signals for control of the ego vehicle enables direct interactions with vehicle control systems for performing longitudinal and lateral control of a vehicle.

According to a tenth embodiment is provided that the method further comprises the step of combining the longitudinal and lateral control signals to a combined control signal for combined longitudinal and lateral control of the ego vehicle.

The provision of combining the longitudinal and lateral control signals to a combined control signal for combined longitudinal and lateral control of the ego vehicle further enhances the possibility of direct interactions with vehicle control systems for performing longitudinal and lateral control of a vehicle.

According to an eleventh embodiment is provided an Advanced Driver Assistance System arranged to perform the method of trajectory planning for maneuvers according to the previously described method.

The provision of an Advanced Driver Assistance System as above enables vehicles to perform maneuvers in general traffic situations, both highway and urban traffic situation maneuvers such as lane changes, intersection crossing, and roundabout entry, whilst following smooth collision-free trajectories therefore.

According to a twelfth embodiment is provided at least part of one of the determined longitudinal and lateral motion trajectories of the requested maneuver is utilized for one or more of the following: deciding if a maneuver should be initiated or aborted; performing a maneuver, autonomously or driver supervised; provide driver guidance for performing a maneuver; provide driver warning and/or information when a maneuver could and should not be performed.

The provision of an Advanced Driver Assistance System as above enables versatile implementations for handling a large variety of traffic situations.

According to a thirteenth embodiment is provided a vehicle that comprises Advanced Driver Assistance System arranged to perform the method of trajectory planning for maneuvers according to the previously described method.

The provision of a vehicle that it comprises an Advanced Driver Assistance System arranged to implement the method of trajectory planning for maneuvers as above is able to perform maneuvers in general traffic situations, both highway and urban traffic situation maneuvers such as lane changes, intersection crossing, and roundabout entry, whilst following smooth collision-free trajectories therefore.

BRIEF DESCRIPTION OF THE DRAWINGS

In the following, embodiments herein will be described in greater detail by way of example only with reference to attached drawings.

FIG. 4 Bottom: illustrates the ego vehicle's longitudinal velocity and acceleration trajectory for the lane change maneuver according to a first scenario;

FIG. 5 Bottom: illustrates the ego vehicle's lateral velocity and acceleration trajectory for the lane change maneuver according to a first scenario;

FIG. 7 Bottom: illustrates the ego vehicle's longitudinal velocity and acceleration trajectory for the lane change maneuver according to a second scenario;

FIG. 8 Bottom: illustrates the ego vehicle's lateral velocity and acceleration trajectory for the lane change maneuver according to a second scenario;

FIG. 9 is a table illustrating Initial conditions for the two considered scenarios of the lane change traffic situation, $\Delta x_0$ denotes the relative position of the ego vehicle and the surrounding vehicles $S_q$, q={1, 2, 3};

FIG. 10 is a table illustrating general design parameters for the longitudinal trajectory planning optimization problem; and FIG. 11 is a table illustrating general design parameters for the lateral trajectory planning optimization problem.

Figure 1:
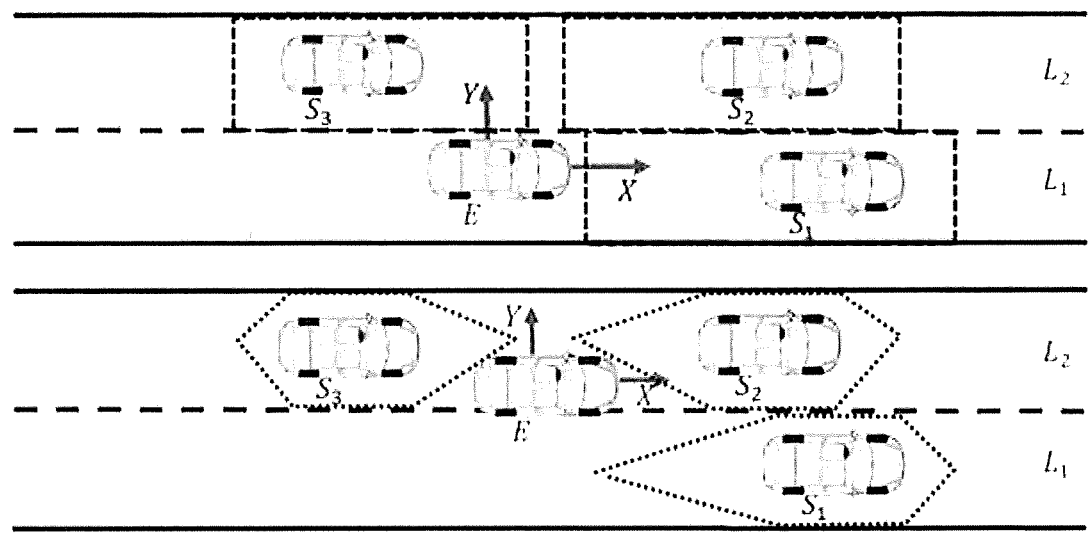
FIG. 1 is a schematic illustration of vehicles travelling on a one-way road with two lanes with rectangular safety critical zones (dashed) and triangular safety critical zones (dotted) for each surrounding vehicle.

Still other features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

This disclosure is based on the realization that in order to increase the autonomous capability of commercial ADAS and eventually allow for fully autonomous driving functionality, a vehicle system should be able to plan how the vehicle should perform different maneuvers in terms of e,g., longitudinal and lateral position, velocity and acceleration trajectories, in order to safely and comfortably follow its planned route while accounting for, and adapting to, the surrounding environment. For that reason, this disclosure is concerned with trajectory planning for an ego vehicle E. In particular, the disclosure proposes a novel trajectory planning method which is applicable to both normal and high risk driving situations.

The trajectories generated using the proposed method may also be used in order to make decisions if a certain maneuver should be performed or not, and also, if required, in order to decide if an initiated maneuver should be aborted. Aborting a maneuver may be appropriate if the predictions made when initiating the maneuver are no longer valid. The trajectories generated may further be used once the maneuver is performed by longitudinal and/or lateral control of ego vehicle, either by an ADAS-system where a vehicle driver supervises the maneuver or where the maneuver is executed autonomously. The trajectories generated may still further be used to provide information/support/guidance to a vehicle driver once the vehicle driver wishes to perform a maneuver. It is further feasible to use the trajectories generated to provide a warning to a vehicle driver and/or perform braking—and/or steering-interventions in order to assist a vehicle driver to abort or complete a maneuver initiated by the vehicle driver should the vehicle driver act in a manner which is judged as unsafe from a comparison with the trajectories generated in accordance with the proposed method.

Since a safe trajectory is used to realize automated ego vehicles E, trajectory planning approaches based on numerical optimization are attractive because the framework provides a means to systematically handle system objectives and constraints. For that reason, herein is presented a trajectory planning method using an algorithm in the Model Predictive Control (MPC) framework. In particular, it extends an extant algorithm by allowing the algorithm to plan trajectories which account for motion dependent safety critical zones of miscellaneous shape defined by both the planned lateral and longitudinal motion of the automated ego vehicle, which the automated ego vehicle E should not enter in order to avoid collisions with surroundings traffic participants and objects.

As such, the algorithm of the proposed method does not only account for rectangular safety critical zones which are defined by, e,g., a time gap which the automated vehicle should maintain to surrounding traffic participants, but rather allows for safety critical zones defined by both the planned lateral and longitudinal motion of the automated vehicle. An automated ego vehicle E is thereby able to efficiently utilize the free road space and traverse dense traffic situation in a self-assertive manner rather than exhibit an excessively conservative behavior.

Firstly will be described the considered trajectory planning problem.

To successfully negotiate traffic situations, an intelligent vehicle system which controls the ego vehicle, E, should be able to plan motion trajectories which allow ego vehicle E to follow its desired route while:
  avoiding collisions with all surrounding traffic participants and objects,
  respecting physical and design limitations as well as the traffic rules.

In addition, ego vehicle E should be able to traverse dense traffic situations in a self-assertive manner rather than excessively conservative.

As an illustrative example, consider the traffic situation depicted in FIG. 1 in which ego vehicle E and the preceding vehicle $S_1$ drive in the lane $L_1$ and two surrounding vehicles $S_2$ and $S_3$ drive in the left adjacent lane $L_2$. By restricting ego vehicle E to remain outside the safety critical zones it is possible to plan motion trajectories which ensure that ego vehicle E avoids collision conflicts with all surrounding vehicles. However, when e,g., planning a lane change maneuver from $L_1$ to $L_2$ in the inter vehicle traffic gap between $S_2$ and $S_3$ the maneuver might be unfeasible with respect to rectangular safety critical zones (dashed) defined by, e,g., a time gap which ego vehicle E should maintain to the surrounding vehicles, as illustrated in the top plot of FIG. 1. This while a safe maneuver might exist for safety critical zones which are defined differently, e,g., triangular safety critical zones (dotted) as illustrated in the bottom plot of FIG. 1. Hence, when planning a motion trajectory, e,g., to execute a lane change maneuver, the safety critical zones which ego vehicle E should respect in order to avoid collision conflicts should account for both the planned lateral and longitudinal motion of E.

Figure 12:
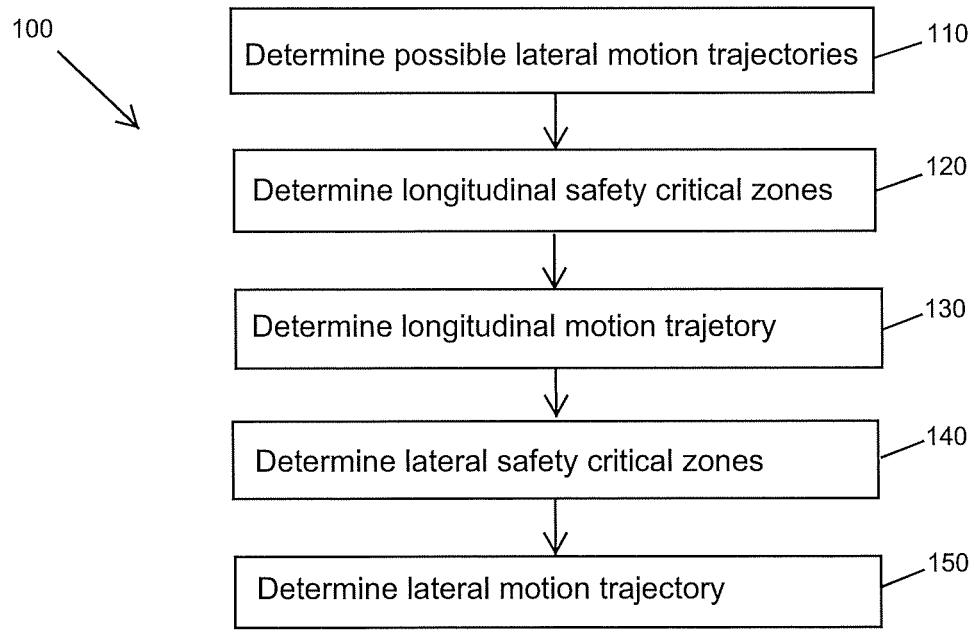
FIG. 12 is a flow chart illustrating an exemplary embodiment of the method as described herein.

With reference to FIG. 12, which shows a flow chart of an exemplary embodiment of the method 100 as describe herein, to account for safety critical zones of miscellaneous shape defined by both the lateral and longitudinal motion of ego vehicle E, the trajectory planning algorithm plans a given maneuver, e,g., a lane change maneuver in a certain inter-vehicle traffic gap, in five main steps:

A. Determine 110 the possible lateral motion trajectories of the maneuver.
B. Determine 120 the longitudinal safety critical zones which correspond to each of the possible lateral trajectories.
C. Determine 130 the longitudinal motion trajectory of the maneuver.
D. Determine 140 the lateral safety critical zones which correspond to the planned longitudinal trajectory.
E. Determine 150 the lateral motion trajectory of the maneuver.

Further details regarding each step of the algorithm will be provided in the following.

The trajectory planning algorithm is formulated based on the following set of assumptions:

A1 Ego vehicle E is equipped with sensor systems which measure its position on the road as well as, e.g., the relative positions and velocities of surrounding traffic participants and objects. Such sensor systems may comprise sensors such as, e.g., one or more of a Radio Detection And Ranging (RADAR) sensor, a Light Detection And Ranging (LIDAR) sensor, a Light Amplification by Stimulated Emission of Radiation (LASER) sensor, a SOund NAvigation and Ranging (SONAR) sensor (e.g., ultrasound), an InfraRed (IR) sensor, an image sensor (e.g., camera), vehicle location devices (e.g., GPS) or any combinations thereof.
A2 Ego vehicle E is equipped with prediction systems which estimate the motion trajectories of surrounding traffic participants and objects over a time horizon.
A3 Ego vehicle E is equipped with low-level control systems capable of following the planned trajectory.
A4 Ego vehicle E is equipped with a decision-making system which provides a desired maneuver request, e.g., a left lane change maneuver.

Figure 13:
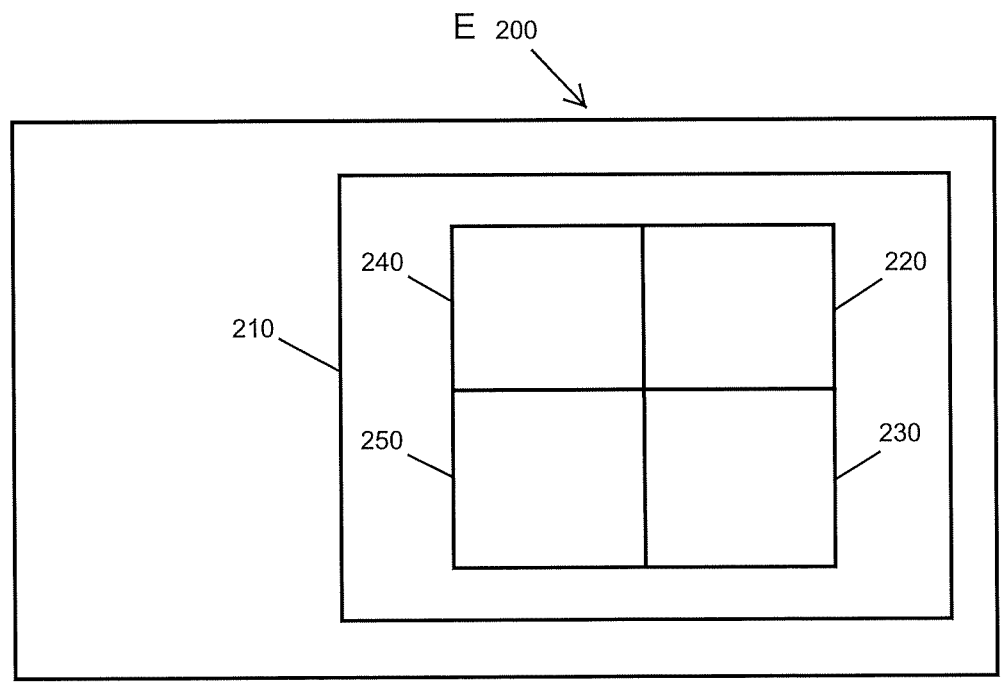
FIG. 13 is a block diagram illustrating an exemplary ego vehicle and exemplary embodiments of the systems as described herein.

With reference to FIG. 13, which illustrates an exemplary ego vehicle (E) 200, it should be noted that any driver assistance system and/or advanced driver assistance system 210, sensor system 220, prediction system 230, control system 240, and/or decision-making system 250, as well as any other system, device, unit or the like described herein may comprise and/or be implemented in or by one or more appropriately programmed processors (e.g., one or more microprocessors including central processing units (CPU)) and associated memory and/or storage, which may include operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

Examples of the assumed decision-making system, low-level control system, prediction system, and the necessary sensor technology are extant. Furthermore, uncertainties resulting from the sensor and prediction systems can be taken into account by, e.g., increasing the safety margins which ego vehicle E should maintain to the surrounding traffic participants and objects over the prediction horizon in relation to the confidence level of the assumed systems. In addition, the re-planning nature of receding horizon MPC allows changes in the perceived environment to be accounted for at each time instance.

In the following will be provided further details regarding the step of determining the possible lateral motion trajectories of the maneuver.

In order to account for the lateral motion of ego vehicle E when determining the longitudinal safety critical zones, i.e., the distance which ego vehicle E should maintain to each relevant traffic participant and object at each time instant, some lateral motion trajectories of the maneuver should be determined. For instance, if ego vehicle E should traverse an intersection or a roundabout, some possible lateral trajectories can be defined such that they follow the shape of a typical maneuver in the corresponding traffic environment. Furthermore, by considering a lane change maneuver as laterally moving ego vehicle E from its current lane into its target lane, lateral lane change trajectories can be generated, e.g., as splines or by a standard LQ-controller tracking some reference function, e.g., a step function from E's current to its desired lateral position, e.g., the center of the adjacent lane, or the rightmost (if a left lane change) or leftmost (if a right lane change) intersection point of the anticipated safety critical zones of the vehicles which constitutes the targeted inter-vehicle traffic gap.

A set of possible lateral motion trajectories for the maneuver can thus be generated by initiating the lateral motion of the maneuver over a discrete time interval which may be defined as $$i \in [1, \ldots, \min(N, N_g) - (n_o + n_{min})]; \tag{1}$$

where N denotes the prediction horizon, $N_g$ denotes the time instance for which the targeted inter-vehicle traffic gap is no longer appropriate, $n_o$ denotes the predicted time it takes for the vehicles constituting a tight inter-vehicle traffic gap to smoothly adjust their velocities in order to allow ego vehicle E to enter the gap, and $n_{min}$ denotes the minimum time it takes for ego vehicle E to laterally move into the targeted inter-vehicle traffic gap.

In the following will be provided further details regarding the step of determining the longitudinal safety critical zones which correspond to each of the possible lateral trajectories.

Figure 2:
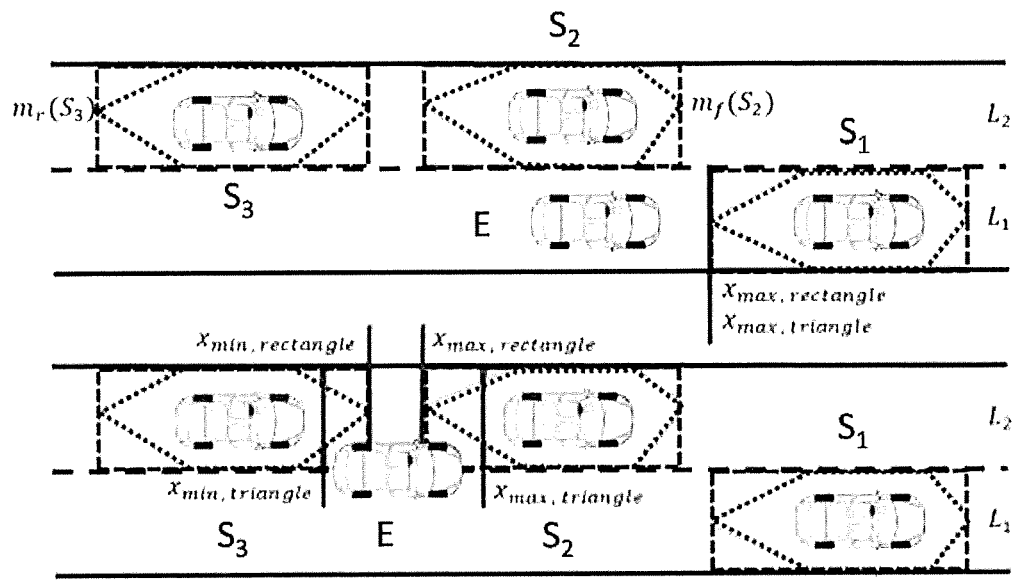
FIG. 2 is a schematic illustration of the maximum and minimum bounds on the ego vehicle's longitudinal position depending on its planned lateral position for rectangular and triangular safety critical zones for each surrounding vehicle.

When the set of possible lateral motion trajectories of the maneuver has been generated, the corresponding longitudinal safety critical zone for each relevant surrounding traffic participant and object can be defined as an appropriate miscellaneous shape, e.g., rectangular, triangular, or ellipsoid. For instance, the safety critical zone of a surrounding vehicle can, e.g., be defined as a box which covers the vehicle's body and two rectangular/triangular/semicircular areas as illustrated in FIG. 2. The safety margin which defines the front most position of the rectangle/triangle/semicircle is denoted by $m_f$, which may be defined as $$m_f(S_{jk}) = \max(\in S_{jk}, \tau S_{jk} v S_{jk}), \forall k=1, \ldots, N, \tag{2}$$

where $vS_j$ denotes the longitudinal velocity of the surrounding vehicle $S_j$, and $\in S_j$ and $\tau S_j$ respectively denotes the minimum distance and time gap which ego vehicle E should maintain to $S_j$ with respect to $S_j$'s front. Similarly, the safety margin which defines the rearmost position of the rectangle/triangle/semicircle is denoted by $m_r$, which may be defined as $$m_r(S_{jk}) = \max(\Xi S_{jk}, \Gamma S_{jk} v S_{jk}), \forall k=1, \ldots, N, \tag{3}$$

where $\Xi S_j$ and $\Gamma S_j$ respectively denotes the minimum distance and time gap which ego vehicle E should maintain to $S_j$ with respect to $S_j$'s rear.

For each possible lateral motion trajectory of the maneuver and corresponding longitudinal safety critical zones, the maximum and minimum bounds on ego vehicle E's longitudinal position at each time instance can thus be defined as a longitudinal safety corridor. As such, the longitudinal distance which ego vehicle E should maintain to each surrounding vehicle is defined with respect to its planned lateral motion trajectory. For instance, when planning a left lane change maneuver, the upper bound on ego vehicle E's longitudinal position throughout the maneuver can be determined as $$x_{max_k} = \begin{cases} \min_{j \in \mathcal{F}_{L_1}} x_{rs_{j_k}} & \text{if } y_k \leq c_k - \frac{w}{2}, \\ \min_{j \in \mathcal{F}_{L_1}, \mathcal{F}_{L_2}} x_{rs_{j_k}} & \text{if } c_k - \frac{w}{2} < y_k < c_k + \frac{w}{2}, \\ \min_{j \in \mathcal{F}_{L_2}} x_{rs_{j_k}} & \text{if } y_k \geq c_k + \frac{w}{2}, \\ \forall k = 1, \ldots, N, \end{cases} \quad (4)$$

where $$x_{rs_j}$$

denotes the longitudinal safe position with respect to the rear of the j-th surrounding vehicle, y denotes ego vehicle E's planned lateral position, c denotes the center-line of ego vehicle E's current and target lane, and w denotes the width of ego vehicle E.

The sets $F_{L_1}$ and $F_{L_2}$ respectively contains the preceding surrounding vehicles in the lanes $L_1$ and $L_2$.

Similarly, the lower boundary on the longitudinal position of ego vehicle E is determined by $$x_{min_k} = \begin{cases} \max_{j \in \mathcal{R}_{L_1}} x_{fs_{j_k}} & \text{if } y_k \leq c_k - \frac{w}{2}, \\ \max_{j \in \mathcal{R}_{L_1}, \mathcal{R}_{L_2}} x_{fs_{j_k}} & \text{if } c_k - \frac{w}{2} < y_k < c_k + \frac{w}{2}, \\ \max_{j \in \mathcal{R}_{L_2}} x_{fs_{j_k}} & \text{if } y_k \geq c_k + \frac{w}{2}, \\ \forall k = 1, \ldots, N, \end{cases} \quad (5)$$

where $$x_{fs_j}$$

denotes the longitudinal safe position with respect to the front of the j-th surrounding vehicle and the sets $R_{L_1}$ and $R_{L_2}$ respectively contains the rear surrounding vehicles in the lanes $L_1$ and $L_2$ Hence, if the safety critical zones of surrounding vehicles are defined by, e,g., a triangular or a semicircular shape, ego vehicle E is allowed to squeeze into inter-vehicle traffic gaps since the longitudinal distance which it should maintain to each surrounding vehicle depends on its planned lateral position as depicted in FIG. 2.

In the following will be provided further details regarding the step of determining the longitudinal motion trajectory of the maneuver.

For each longitudinal safety corridor it should be determined if there exists a longitudinal trajectory which allow ego vehicle E to be positioned within the corridor over the prediction horizon and selected, from the determined existing longitudinal trajectories for all longitudinal safety corridors, the most appropriate longitudinal trajectory. To simply determine whether such a longitudinal trajectory exist, the reachable set of ego vehicle E can crudely be approximated by a set of trajectories which, e.g., is generated by an ACC function. To allow for safe and smooth maneuvers which are within the capability of the assumed low-level control systems of ego vehicle E, the most appropriate trajectory is selected as the trajectory which fulfills the following set of constraints:

$$x_{min_k} \leq x_k \leq x_{max_k}; \forall k = 1, \ldots, N \quad (6a)$$

$$v_{x_{min_k}} \leq v_{x_k} \leq v_{x_{max_k}}; \forall k = 1, \ldots, N \quad (6b)$$

$$a_{x_{min_k}} \leq a_{x_k} \leq a_{x_{max_k}}; \forall k = 1, \ldots, N \quad (6c)$$

$$\Delta a_{x_{min_k}} \leq \Delta a_{x_k} \leq \Delta a_{x_{max_k}}; \forall k = 1, \ldots, N \quad (6d)$$

while minimizing the cost function $$J_x = \sum_{k=1}^{N} \alpha_k \left( v_{x_k} - v_{x_{des_k}} \right)^2 + \beta a_{x_k}^2 + \gamma_k \Delta a_{x_k}^2; \quad (7)$$

Where x, $v_x$, $\alpha_x$, and $\Delta\alpha_x$ respectively denotes ego vehicle E's longitudinal position, velocity, acceleration, and jerk, $v_{x_{des}}$ denotes ego vehicle E's desired longitudinal velocity, and $\alpha$, $\beta$, and $\gamma$ are positive weights.

When the most appropriate longitudinal motion trajectory and corresponding safety corridor have been determined it is possible to refine the trajectory by formulating and solving a standard Quadratic Program (QP) optimization problem $$\min_w J = \frac{1}{2} w^T H w + d^T w, \quad (8a)$$

subject to $$H_{eq} w = k_{eq}; \quad (8b)$$

$$H_{in} w \leq k_{in}; \quad (8c)$$

In the following will be provided further details regarding the step of determining the lateral safety critical zones which correspond to the planned longitudinal trajectory.

Utilizing the longitudinal motion trajectory, the safety critical zone of each surrounding vehicle can be updated according to the longitudinal motion of the maneuver. As such a lateral safety corridor can be created in a similar manner as for the longitudinal safety corridor described above.

In the following will be provided further details regarding the step of determining the lateral motion trajectory of the maneuver.

To finalize the trajectory planning of a certain maneuver, the lateral trajectory planning problem is formulated as a standard QP optimization problem (8) with the cost function defined as $$J_y = \sum_{k=1}^{N} \phi_k v_{y_k}^2 + \varphi_k a_{y_k}^2 + \psi_k \Delta a_{y_k}^2, \quad (9)$$

where $v_y$, $a_y$, and $\Delta a_y$ respectively denotes ego vehicle E's lateral velocity, acceleration, and jerk, and $\phi$, $\varphi$, and $\psi$ are positive weights. Furthermore, the lateral dynamics of ego vehicle E is modeled by a simple double integrator in order to linearly express the lateral motion of ego vehicle E as $$y_{k+1} = y_k + v_{y_k} t_s + a_{y_k} \frac{t_s^2}{2}; \forall k = 0, \ldots, N \quad (10a)$$

$$v_{y_{k+1}} = v_{y_k} + a_{y_k} t_s; \forall k = 0, \ldots, N \quad (10b)$$

where y denotes ego vehicle E's lateral position and $t_s$ denotes the discrete sampling time. To allow for safe and smooth maneuvers which are within the capability of the assumed low-level control systems of ego vehicle E, the system (10) is subjected to the following set of constraints $$y_{min_k} \leq y_k \leq y_{max_k}; \forall k = 1, \ldots, N \quad (11a)$$

$$v_{y_{min_k}} \leq v_{y_k} \leq v_{y_{max_k}}; \forall k = 1, \ldots, N \quad (11b)$$

$$a_{y_{min_k}} \leq a_{y_k} \leq a_{y_{max_k}}; \forall k = 1, \ldots, N \quad (11c)$$

$$\Delta a_{y_{min_k}} \leq \Delta a_{y_k} \leq \Delta a_{y_{max_k}}; \forall k = 1, \ldots, N \quad (11d)$$

The optimization problem has N optimization variables, i.e., control input $a_y$, and 10N linear constraints corresponding to vehicle dynamics (10) as well as system limitations and design constraints (11).

In the following section is elaborated how the proposed trajectory planning algorithm may be evaluated in a simulated traffic situation as illustrated in FIGS. 1-2. Two scenarios of the traffic situation are considered, referred to as Scenario 1 and Scenario 2, for which the initial conditions are given in FIG. 9, which is a table illustrating Initial conditions for the two considered scenarios of the lane change traffic situation, where Axo denotes the relative position of the ego vehicle and the surrounding vehicles $S_q$, q={1, 2, 3}.

In both scenarios, the aim of the trajectory planning algorithm is to plan a lane change maneuver which allows ego vehicle E to perform a left lane change in the inter-vehicle traffic gap between surrounding vehicles $S_2$ and $S_3$. As indicated in the table of FIG. 9, Scenario 1 thus entails ego vehicle E to decelerate in order to perform the lane change maneuver while Scenario 2 entails ego vehicle E to accelerate in order to perform the maneuver.

For ease of illustration it is assumed in both scenarios that surrounding vehicles $S_1$; $S_2$; and $S_3$ drive at constant longitudinal velocity without performing lane change maneuvers over the prediction horizon. However, any predicted behavior i.e., trajectory, of the surrounding vehicles can be incorporated into the trajectory planning algorithm when defining the longitudinal and lateral safety corridors as described above.

The trajectory planning algorithm has been implemented as a longitudinal and a lateral QP optimization problem in CVXGEN interfaced with Matlab. The general design parameters for the longitudinal and lateral trajectory planning optimization problems are given in FIGS. 10 and 11 respectively. Thus, FIG. 10 is a table illustrating general design parameters for the longitudinal trajectory planning optimization problem and FIG. 11 is a table illustrating general design parameters for the lateral trajectory planning optimization problem.

As indicated in the table of FIG. 9, in Scenario 1 all vehicles i.e., E; $S_1$; $S_2$; and $S_3$ initially drive at the same longitudinal velocity, and surrounding vehicles $S_2$ and $S_3$ are positioned behind E. Hence ego vehicle E should reduce its velocity in order to reach the inter-vehicle traffic gap between surrounding vehicles $S_2$ and $S_3$ and perform the lane change maneuver.

Figure 3:
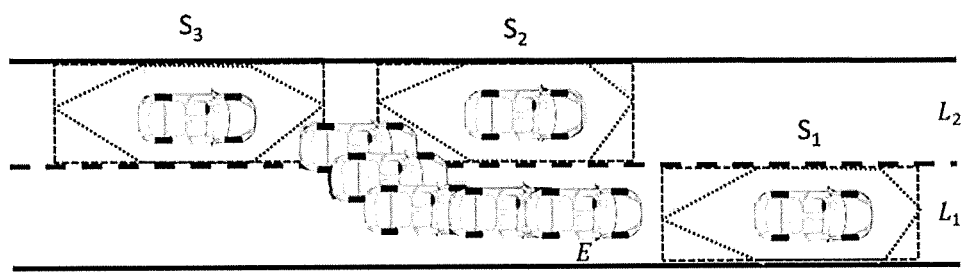
FIG. 3 is a schematic illustration of a lane change maneuver according to a first scenario.
Figure 4:
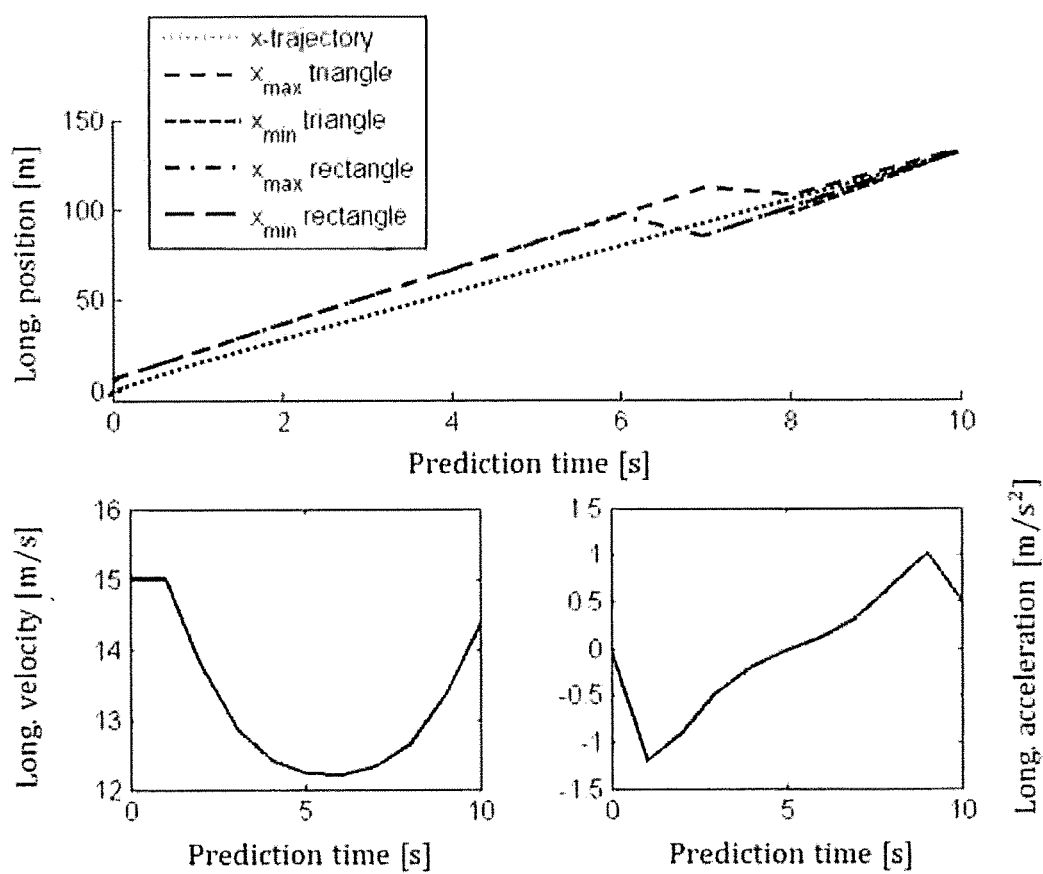
FIG. 4 Top: illustrates longitudinal position trajectory for the ego vehicle's lane change maneuver according to a first scenario, respecting the longitudinal safety corridor defined by the triangular safety critical zones while the longitudinal safety corridor defined by the rectangular safety critical zones is violated.
Figure 5:
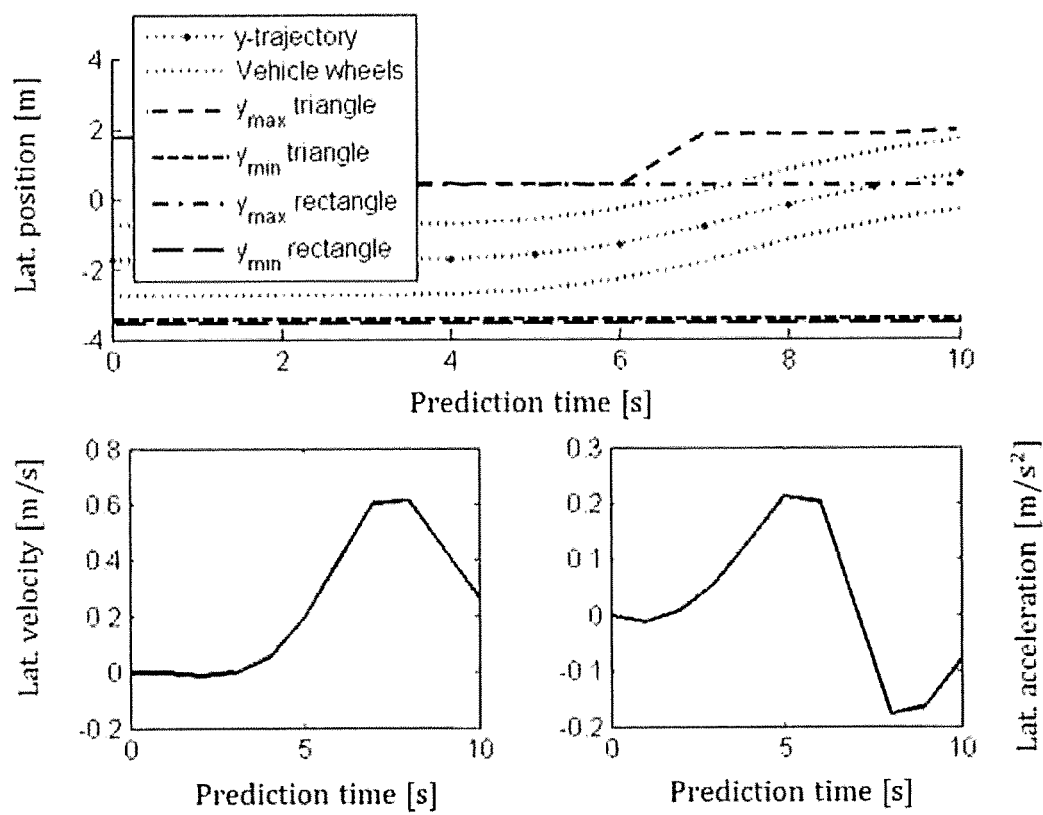
FIG. 5 Top: illustrates lateral position trajectory for the ego vehicle's lane change maneuver, according to a first scenario, respecting the lateral safety corridor defined by the triangular safety critical zones while the lateral safety corridor defined by the rectangular safety critical zones is violated.

FIG. 3 provides a schematic illustration of the planned lane change maneuver while FIGS. 4-5 respectively shows the longitudinal and lateral motion trajectories. From the figures it can be seen that when the safety critical zones for each surrounding vehicle are defined as triangular areas, a lane change maneuver can be successfully planned while the maneuver is unfeasible with respect to rectangular safety critical zones. Furthermore, FIGS. 4-5 show that ego vehicle E decelerates in order to reach the inter-vehicle traffic gap between surrounding vehicles $S_2$ and $S_3$, and once it is aligned with the gap it performs the lateral motion into the target lane and increases its longitudinal velocity in order to maintain a safe distance to surrounding vehicles $S_2$ and $S_3$.

Figure 6:
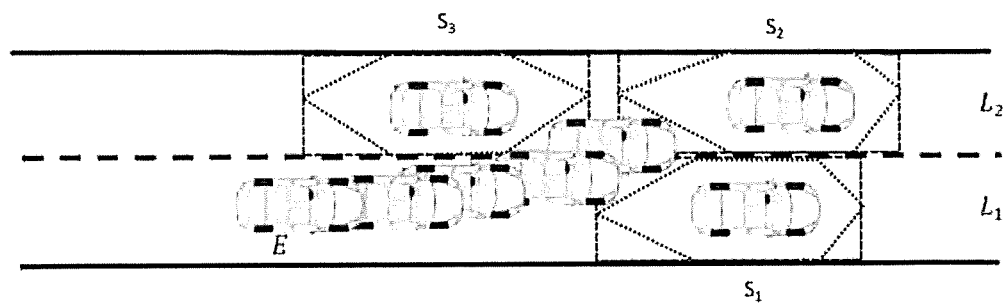
FIG. 6 is a schematic illustration of the lane change maneuver according to a second scenario.
Figure 7:
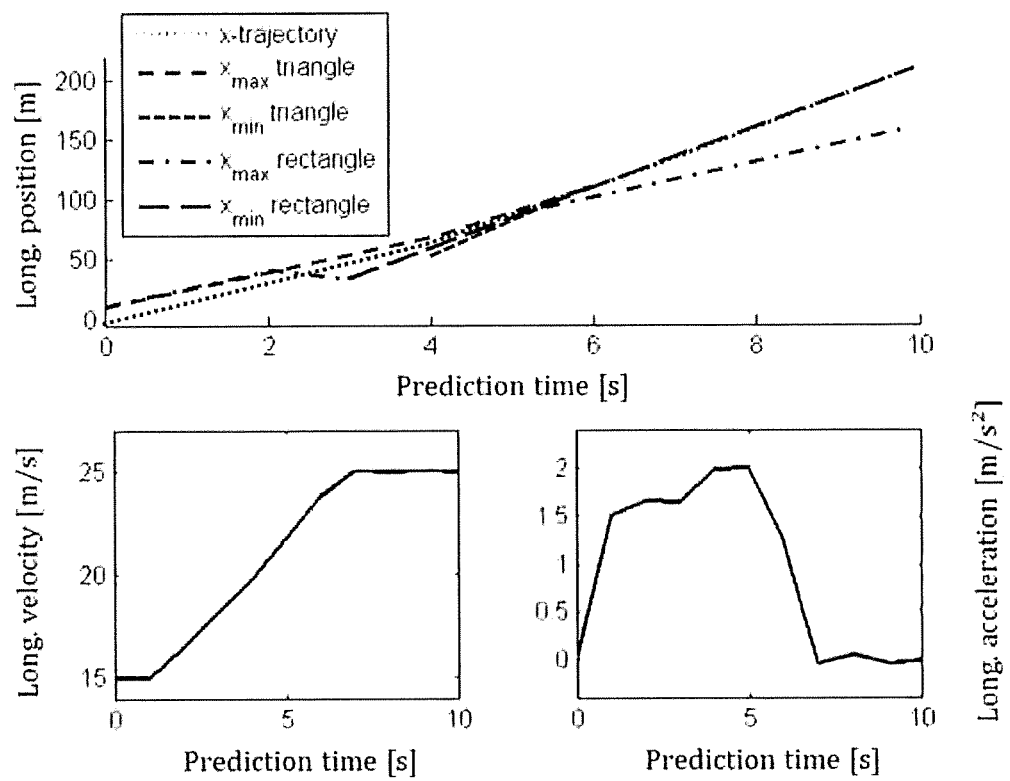
FIG. 7 Top: illustrates longitudinal position trajectory for the ego vehicle's lane change maneuver according to a second scenario, respecting the longitudinal safety corridor defined by the triangular safety critical zones while the longitudinal safety corridor defined by the rectangular safety critical zones is violated.
Figure 8:
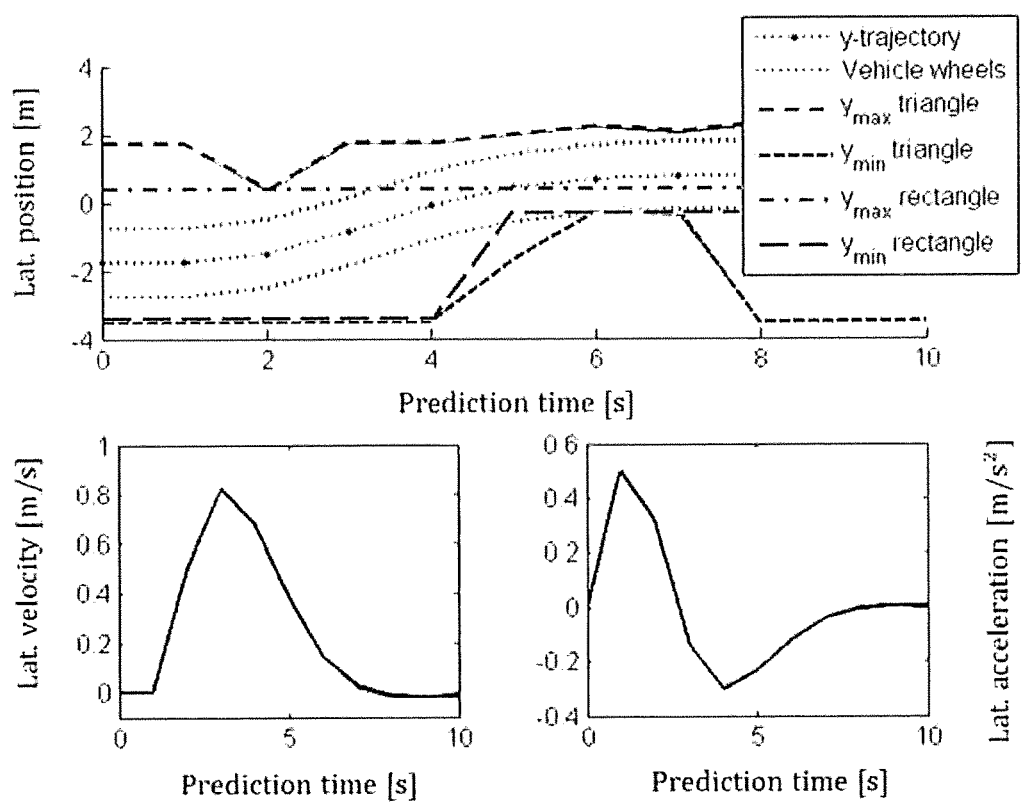
FIG. 8 Top: illustrates alateral position trajectory for the ego vehicle's lane change maneuver according to a second scenario, respecting the lateral safety corridor defined by the triangular safety critical zones while the lateral safety corridor defined by the rectangular safety critical zones is violated.

FIG. 6 provides a schematic illustration of the planned lane change maneuver for Scenario 2 in which ego vehicle E and surrounding vehicle S1 initially drive at 15 m/s while surrounding vehicles $S_2$ and $S_3$ drive at 25 m/s as indicated in the table of FIG. 9. As shown in FIGS. 7-8 ego vehicle E should accelerate in order to reach the inter-vehicle traffic gap between surrounding vehicles $S_2$ and $S_3$, and once it is aligned with the gap it performs the lateral motion into the target lane. From FIGS. 6-8 it can further be seen that when the safety critical zones for each surrounding vehicle are defined as triangular areas, a lane change maneuver can be successfully planned while the maneuver is unfeasible with respect to rectangular safety critical zones.

In both Scenario 1 and Scenario 2, the planned trajectory entails ego vehicle E to not be fully positioned in the target lane at the end of the prediction horizon. Subsequently, if neither surrounding vehicles $S_2$ nor $S_3$ adjusts their velocity to allow ego vehicle E to complete the lane change maneuver while its execution, ego vehicle E should be able to abort the maneuver and return to its original lane. Hence, if a trajectory which entails ego vehicle E to be fully positioned in the target lane cannot be planned prior to ego vehicle E being positioned at a minimum distance to surrounding vehicle $S_1$ for which it can smoothly adjust its trajectory and safely follow surrounding vehicle $S_1$ in the original lane, the maneuver should be aborted.

Thus, as shown above a trajectory planning algorithm that accounts for safety critical zones of miscellaneous shape defined by both the planned lateral and longitudinal motion of the automated vehicle may be used for the method presented herein. As such, the proposed Method is able to generate trajectories which allow the ego vehicle, especially if partly or highly automated, to efficiently utilize the free road space, e.g., by safely, smoothly, and self-assertively squeeze into an inter-vehicle traffic gap in the target lane in order to perform a tight lane change maneuver.

As described above the method of trajectory planning for maneuvers for an ego vehicle E equipped with: sensor systems to measure its position on the road as well as the relative positions and velocities of surrounding traffic participants and objects; prediction systems to estimate the motion trajectories of surrounding traffic participants and objects over a defined time horizon; low-level control systems capable of following a planned trajectory; and a decision-making system to provide a desired maneuver request, comprises the steps of, using receding horizon control applying a finite prediction horizon, for determining:

possible lateral motion trajectories of a requested maneuver;

longitudinal safety critical zones which correspond to each of the determined possible lateral motion trajectories;

a longitudinal motion trajectory of the requested maneuver;

lateral safety critical zones which correspond to the determined longitudinal motion trajectory of the requested maneuver;

a lateral motion trajectory of the requested maneuver.

According to some embodiments the method further comprises generating a set of possible lateral motion trajectories for the requested maneuver by initiating the lateral motion of the maneuver over a discrete time interval.

According to further embodiments the discrete time interval is defined as $i \in [1, \ldots, \min(N, N_g)-(n_o+n_{min})]$ where N denotes the prediction horizon, $N_g$ denotes the time instance for which the targeted inter-vehicle traffic gap is no longer appropriate, $n_o$ denotes the predicted time it takes for any surrounding vehicles constituting a tight inter-vehicle traffic gap to smoothly adjust their velocities in order to allow ego vehicle E to enter the gap, and $n_{min}$ denotes the minimum time it takes for ego vehicle E to laterally move into the targeted inter-vehicle traffic gap.

According to yet some embodiments the method further comprises defining, when the set of possible lateral motion trajectories of the maneuver has been generated, a corresponding longitudinal safety critical zone for each relevant surrounding traffic participant and object as an appropriate miscellaneous shape, such as rectangular, triangular, or ellipsoid.

According to still further embodiments the method further comprises defining, for each possible lateral motion trajectory of the requested maneuver and corresponding safety critical zones, the maximum and minimum bounds on the longitudinal position of ego vehicle E at each time instance as a longitudinal safety corridor, such that the longitudinal distance which ego vehicle E should maintain to each relevant surrounding traffic participant and object is defined with respect to each possible lateral motion trajectory of the requested maneuver and corresponding safety critical zones.

According to yet further embodiments the method further comprises determining, for each longitudinal safety corridor, if there exists a longitudinal trajectory which allow ego vehicle E to be positioned within the corridor over the prediction horizon and selecting, from the determined existing longitudinal trajectories for all longitudinal safety corridors, the most appropriate longitudinal trajectory.

According to yet some embodiments the method further comprises updating the safety critical zones of each relevant surrounding traffic participant and object according to the longitudinal motion of the requested maneuver utilizing the determined longitudinal motion trajectory of the requested maneuver.

According to still some embodiments the step of determining a lateral motion trajectory of the requested maneuver further comprises formulating the lateral motion trajectory planning problem as a standard Quadratic Program optimization problem and solving this problem.

According to yet further embodiments the method further comprises utilizing at least part of one of the determined longitudinal and lateral motion trajectories of the requested maneuver to determine longitudinal and/or lateral control signals for control of the ego vehicle.

According to still some further embodiments the method further comprises the step of combining the longitudinal and lateral control signals to a combined control signal for combined longitudinal and lateral control of the ego vehicle.

The proposed method is also considered to be a building block for Advanced Driver Assistance Systems (ADAS) and eventually highly automated vehicles which are safe, smooth, and self-assertive.

This, in accordance with the present application is also envisaged an Advanced Driver Assistance System arranged to perform the method of trajectory planning for maneuvers as described in the foregoing.

In accordance with the present application is also envisaged an Advanced Driver Assistance System where at least part of one of the determined longitudinal and lateral motion trajectories of the requested maneuver is utilized for one or more of the following: deciding if a maneuver should be initiated or aborted; performing a maneuver, autonomously or driver supervised; provide driver guidance for performing a maneuver; provide driver warning and/or information when a maneuver could and should not be performed.

Here it is possible to choose to only perform/evaluate or use part of either trajectory, i.e., part of the prediction time to: inform, warn, support or evaluate a vehicle driver, i.e., if the driver requires information in order to perform a maneuver, requires a warning because a high risk maneuver has been initiated, requires support through the maneuver being performed by an ADAS whilst the driver supervises performance thereof, performance/abortion of an autonomous maneuver, or for evaluating the behavior of the driver, e,g., in terms of which margins the driver keeps to surrounding objects during a certain type of maneuver.

In accordance with the present application is also envisaged a vehicle comprising an Advanced Driver Assistance Systems arranged to implement the method of trajectory planning for maneuvers as described in the foregoing.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. A method of trajectory planning for maneuvers for an ego vehicle (E) including a sensor system to measure a position of the vehicle on a road as well as relative positions and velocities of surrounding traffic participants and objects, a prediction system to estimate motion trajectories of surrounding traffic participants and objects over a defined time horizon, a control system capable of following a planned trajectory, and a decision-making system to provide a desired maneuver, the method comprising:

using receding horizon control applying a finite prediction horizon for determining possible lateral motion trajectories of a requested maneuver, wherein determining possible lateral motion trajectories of the requested maneuver comprises generating a set of possible lateral motion trajectories for the requested maneuver by initiating lateral motion of the maneuver over a discrete time interval;

longitudinal safety critical zones for each relevant surrounding traffic participant and object which correspond to each of the determined possible lateral motion trajectories;

a longitudinal motion trajectory of the requested maneuver;

lateral safety critical zones for each relevant surrounding traffic participant and object which correspond to the determined longitudinal motion trajectory of the requested maneuver; and a lateral motion trajectory of the requested maneuver from the determined possible lateral motion trajectories.

2. The method according to claim 1 wherein the discrete time interval is defined as $i \in [1, \ldots, \min(N, N\_g)-(n\_o+n\_min)]$ where N denotes a prediction horizon, N_g denotes a time instance for which a targeted inter-vehicle traffic gap is no longer appropriate, n_o denotes a predicted time it takes for any surrounding vehicles constituting a tight inter-vehicle traffic gap to smoothly adjust their velocities in order to allow the ego vehicle (E) to enter the targeted inter-vehicle traffic gap, and n_min denotes a minimum time it takes for the ego vehicle (E) to laterally move into the targeted inter-vehicle traffic gap.

3. The method according to claim 1 further comprising defining, when the set of possible lateral motion trajectories of the maneuver has been generated, a corresponding longitudinal safety critical zone for each relevant surrounding traffic participant and object as a miscellaneous shape comprising a triangular, semi-circular, or ellipsoid shape.

4. The method according to claim 3 further comprising defining, for each possible lateral motion trajectory of the requested maneuver and corresponding safety critical zones, maximum and minimum bounds on the longitudinal position of the ego vehicle (E) at each time instance as a longitudinal safety corridor, wherein a longitudinal distance which the ego vehicle (E) should maintain to each relevant surrounding traffic participant and object is defined with respect to each possible lateral motion trajectory of the requested maneuver and corresponding longitudinal safety critical zones.

5. The method according to claim 4 further comprising determining, for each longitudinal safety corridor, whether there exists a longitudinal trajectory which allows the ego vehicle (E) to be positioned within the corridor over the prediction horizon and selecting, from the determined existing longitudinal trajectories for all longitudinal safety corridors, one of the determined existing longitudinal trajectories.

6. The method according to claim 1 further comprising updating the safety critical zones of each relevant surrounding traffic participant and object according to the longitudinal motion of the requested maneuver utilizing the determined longitudinal motion trajectory of the requested maneuver.

7. The method according to claim 1 wherein determining the lateral motion trajectory of the requested maneuver further comprises formulating lateral motion trajectory planning as a standard Quadratic Program optimization problem and solving the problem.

8. The method according to claim 1 further comprising utilizing at least part of one of the determined longitudinal and lateral motion trajectories of the requested maneuver to determine longitudinal and/or lateral control signals for control of the ego vehicle (E).

9. The method according to claim 1 further comprising utilizing at least part of one of the determined longitudinal and lateral motion trajectories of the requested maneuver to determine longitudinal and lateral control signals for control of the ego vehicle (E) and combining the longitudinal and lateral control signals to a combined control signal for combined longitudinal and lateral control of the ego vehicle (E).

10. A driver assistance system configured to plan a trajectory for a maneuver for an ego vehicle, wherein the vehicle includes a sensor system to measure a vehicle position on a road as well as the relative positions and velocities of surrounding traffic participants and objects, a prediction system to estimate motion trajectories of the surrounding traffic participants and objects over a defined time horizon, a control system configured to follow a planned trajectory, and a decision-making system to provide a desired maneuver, the driver assistance system configured to use receding horizon control applying a finite prediction horizon to:

determine possible lateral motion trajectories of a requested maneuver, wherein, to determine possible lateral motion trajectories of the requested maneuver, the driver assistance system is further configured to generate a set of possible lateral motion trajectories for the requested maneuver by initiating lateral motion of the maneuver over a discrete time interval;

determine longitudinal safety critical zones for each relevant surrounding traffic participant and object which correspond to each of the determined possible lateral motion trajectories;

determine a longitudinal motion trajectory of the requested maneuver;

determine lateral safety critical zones for each relevant surrounding traffic participant and object which correspond to the determined longitudinal motion trajectory of the requested maneuver; and determine a lateral motion trajectory of the requested maneuver from the determined possible lateral motion trajectories.

11. The driver assistance system according to claim 10 wherein at least part of one of the determined longitudinal and lateral motion trajectories of the requested maneuver is utilized for one or more of the following:

deciding whether the requested maneuver should be initiated or aborted;

performing the requested maneuver, autonomously or driver supervised;

providing driver guidance for performing the requested maneuver; and providing driver warning and/or information when the requested maneuver could and should not be performed.

12. The driver assistance system according to claim 10 wherein the corresponding longitudinal safety critical zone for each relevant surrounding traffic participant and object comprises a miscellaneous shape comprising a triangular, semi-circular, or ellipsoid shape.

13. A vehicle comprising the driver assistance system according to claim 10.

14. A method of trajectory planning for maneuvers for an ego vehicle (E) including a sensor system to measure a position of the vehicle on a road as well as relative positions and velocities of surrounding traffic participants and objects, a prediction system to estimate motion trajectories of the surrounding traffic participants and objects over a defined time horizon, a control system configured to follow a planned trajectory, and a decision-making system to provide a desired maneuver, the method comprising:

determining possible lateral motion trajectories of a requested maneuver, wherein determining possible lateral motion trajectories of the requested maneuver comprises generating a set of possible lateral motion trajectories for the requested maneuver by initiating lateral motion of the maneuver over a discrete time interval;

determining longitudinal safety critical zones for each relevant surrounding traffic participant and object which correspond to each of the determined possible lateral motion trajectories;

determining a longitudinal motion trajectory of the requested maneuver;

determining lateral safety critical zones for each relevant surrounding traffic participant and object which correspond to the determined longitudinal motion trajectory of the requested maneuver; and determining a lateral motion trajectory of the requested maneuver from the determined possible lateral motion trajectories.

15. The method of claim 14 further comprising using receding horizon control applying a finite prediction horizon for determining the possible lateral motion trajectories, determining the longitudinal safety critical zones, determining the longitudinal motion trajectory, determining the lateral safety critical zones, and determining the lateral motion trajectory.

16. The method according to claim 14 wherein the discrete time interval is defined as $i \in [1, \ldots, \min(N, N\_g) - (n\_o + n\_min)]$ where N denotes a prediction horizon, $N\_g$ denotes a time instance for which a targeted inter-vehicle traffic gap is no longer appropriate, $n\_o$ denotes a predicted time it takes for any surrounding vehicles constituting a tight inter-vehicle traffic gap to smoothly adjust their velocities in order to allow ego vehicle (E) to enter the targeted inter-vehicle traffic gap, and $n\_min$ denotes a minimum time it takes for the ego vehicle (E) to laterally move into the targeted inter-vehicle traffic gap.

17. The method according to claim 14 further comprising defining, when the set of possible lateral motion trajectories of the maneuver has been generated, a corresponding longitudinal safety critical zone for each relevant surrounding traffic participant and object as a triangular, semi-circular, or ellipsoid shape.

18. The method according to claim 17 further comprising defining, for each possible lateral motion trajectory of the requested maneuver and corresponding safety critical zones, maximum and minimum bounds on the longitudinal position of ego vehicle (E) at each time instance as a longitudinal safety corridor, wherein a longitudinal distance which the ego vehicle (E) should maintain to each relevant surrounding traffic participant and object is defined with respect to each possible lateral motion trajectory of the requested maneuver and corresponding longitudinal safety critical zones.

19. The method according to claim 14 further comprising updating the safety critical zones of each relevant surrounding traffic participant and object according to the longitudinal motion of the requested maneuver utilizing the determined longitudinal motion trajectory of the requested maneuver.

20. The method according to claim 14 wherein the corresponding longitudinal safety critical zone for each relevant surrounding traffic participant and object comprises a miscellaneous shape comprising a triangular, semi-circular, or ellipsoid shape.

* * * * *